(12) United States Patent
Kazi et al.

(10) Patent No.: US 9,832,158 B2
(45) Date of Patent: Nov. 28, 2017

(54) REAL-TIME FAN ENGAGEMENT

(71) Applicant: FACEBOOK, INC., Menlo Park, CA (US)

(72) Inventors: Rousseau Kazi, Moreno Valley, CA (US); Yuankai Ge, Palo Alto, CA (US)

(73) Assignee: FACEBOOK, INC., Menlo Park, CA (US)

( * ) Notice: Subject to any disclaimer, the term of this patent is extended or adjusted under 35 U.S.C. 154(b) by 94 days.

(21) Appl. No.: 13/839,464

(22) Filed: Mar. 15, 2013

(65) Prior Publication Data

US 2014/0280556 A1    Sep. 18, 2014

(51) Int. Cl.
| | |
|---|---|
| G06F 15/16 | (2006.01) |
| H04L 12/58 | (2006.01) |
| H04L 29/08 | (2006.01) |
| G06Q 50/00 | (2012.01) |
| H04W 4/20 | (2009.01) |

(52) U.S. Cl.
CPC ............ *H04L 51/32* (2013.01); *H04L 67/306* (2013.01); *G06Q 50/01* (2013.01); *H04W 4/206* (2013.01)

(58) Field of Classification Search
None
See application file for complete search history.

(56) References Cited

U.S. PATENT DOCUMENTS

| | | | | |
|---|---|---|---|---|
| 7,853,881 | B1 * | 12/2010 | Aly Assal et al. ............ | 715/734 |
| 8,312,056 | B1 * | 11/2012 | Peng ...................... | G06Q 50/01 |
| | | | | 705/319 |
| 8,380,639 | B2 * | 2/2013 | Aleong et al. ................ | 705/319 |
| 2010/0125563 | A1 | 5/2010 | Nair et al. ..................... | 707/709 |
| 2012/0253918 | A1 * | 10/2012 | Marois .................. | G06Q 30/02 |
| | | | | 705/14.39 |
| 2012/0311060 | A1 * | 12/2012 | Beck .................... | G06Q 10/107 |
| | | | | 709/206 |
| 2012/0324027 | A1 * | 12/2012 | Vaynblat et al. ............ | 709/206 |
| 2013/0018714 | A1 * | 1/2013 | George ...................... | 705/14.16 |
| 2013/0073979 | A1 * | 3/2013 | Shepherd et al. ............ | 715/744 |
| 2014/0222561 | A1 * | 8/2014 | Mathur ...................... | 705/14.53 |
| 2014/0250182 | A1 * | 9/2014 | Klemm ................. | H04L 67/306 |
| | | | | 709/204 |
| 2014/0257991 | A1 * | 9/2014 | Christensen et al. ....... | 705/14.66 |
| 2014/0280108 | A1 * | 9/2014 | Dunn et al. ................... | 707/728 |
| 2016/0080307 | A1 * | 3/2016 | Rao ...................... | G06Q 10/107 |
| | | | | 709/206 |

* cited by examiner

*Primary Examiner* — Yves Dalencourt
(74) *Attorney, Agent, or Firm* — Nicholson De Vos Webster & Elliott LLP

(57) ABSTRACT

A method for improving engagement between users of a social network and entity pages within the social network is described. Historical and real-time user interaction data may be logged and aggregated in order to identify engagement opportunities where notification to fan page owners, posting of a new post, or promotion of a post may increase engagement of users with entities via pages on a social network.

16 Claims, 8 Drawing Sheets

REAL-TIME FAN ENGAGEMENT

FIELD OF INVENTION

The present invention generally relates to network-based interactions, and more particularly, to a method and system for identifying opportunities to increase engagement of users of a social network with fan pages within the social network.

BACKGROUND

Many networks (such as a social network) enable an entity (e.g. a corporation, an organization, or a public individual) to interact with users (e.g. private individuals). Social networks enable a user to indicate a personal interest in an entity, and allows the entity to communicate and interact with interested users via the network. Such interactions may, for example, promote a brand, garner support for issues and persons, or increase commercial opportunities. In addition, social networks enable entities to reach new third-party users through engaged users. The more users who see entity communications, the greater the engagement and reach the entity will have. As such, entities may seek to identify engagement opportunities, such as times of peak traffic, to increase engagement with social network users.

DETAILED DESCRIPTION

Figure 1:
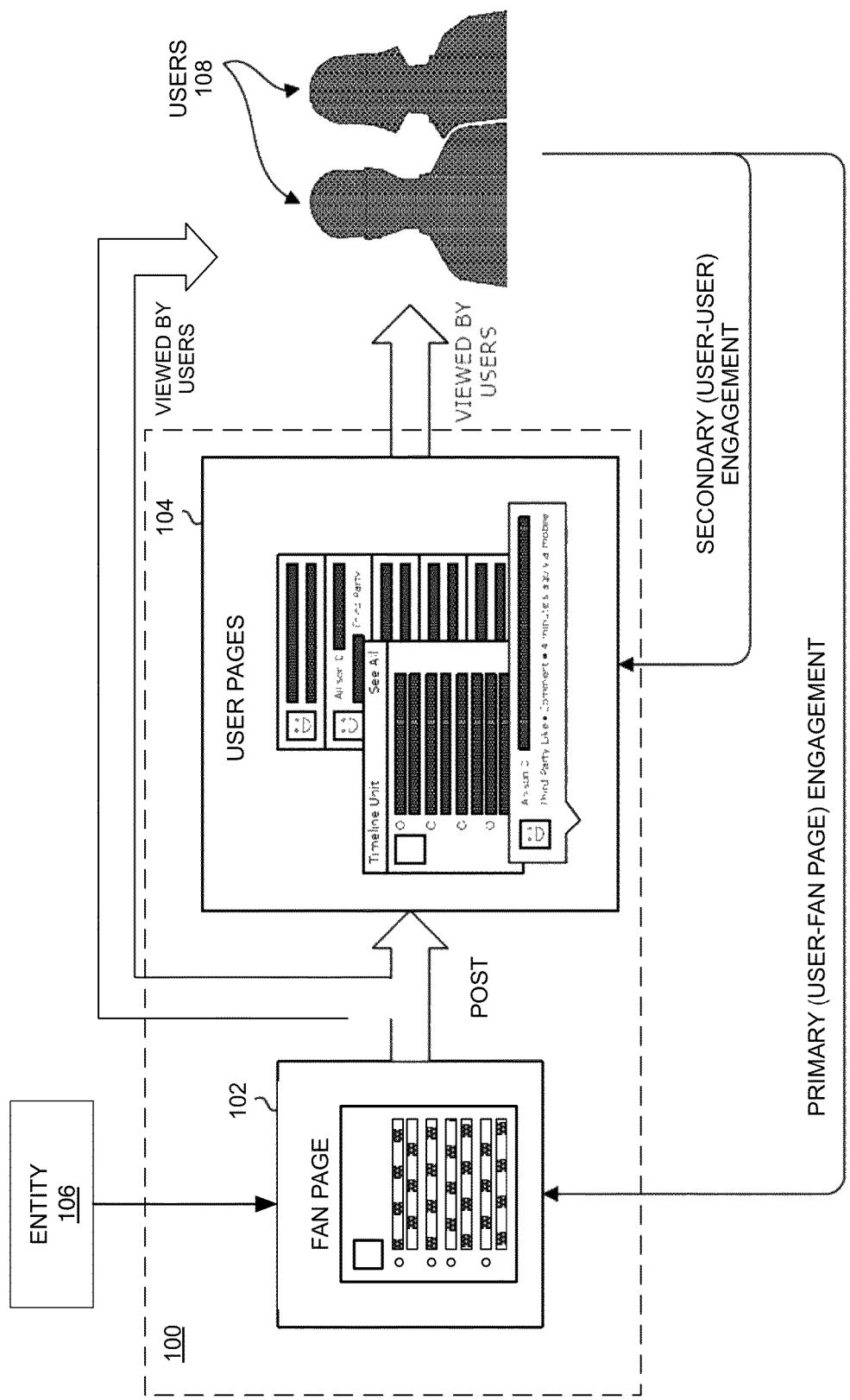
FIG. 1 illustrates users of a social network engaging directly and indirectly with a fan page, according to an embodiment of the invention.

A system, method, and apparatus for identifying opportunities to increase engagement of social network users with entity pages associated with the network are described. Social networks provide a unique opportunity for an entity, such as a corporation, an organization, a public individual, or a concept, to engage directly with interested persons. For example, an entity may have a presence on a social network by creating a web-based page, which may include information about the entity, and "posts" informing page viewers or visitors about news and current events related to the entity, special offers, advertisements, or promotions. By indicating an interest in the entity's page, an interested person may elect to receive updates regarding the entity via the social network, for example, receiving notification of the entity's new posts to the entity's web page. The interested social network user may then choose to interact with the entity, for example, by "liking", commenting, sharing, or claiming offers posted by the entity. A user's interactions may be visible to his or her connections. As such, posts are one vehicle for an entity to interact with its fans and other users on a social network to maintain engagement. For example, an interested person's posts regarding the entity may be seen and acted upon by third-party persons connected to the interested person, but who have not established a direct connection with the entity. Contact with indirectly connected persons may extend the engagement and reach of an entity's interaction.

As will be detailed below, embodiments of the invention describe identifying opportunities to increase engagement of social network users with fan pages within the social network. Each user of a social network is directly connected to a number of other users. When an individual user of a social network "likes" or "becomes a fan" of an entity's fan page, the interested user, or "fan," becomes directly connected to the fan page. In addition to viewing information and posts directly on the fan page, any posts or updates to the fan page may be included on the fan's "news feed," which compiles updates and posts from entities and users to which the fan is directly connected. The fan may engage with the entity via the fan page, for example, by "liking" a post, "sharing" a fan page post with his or her connections, commenting on a fan page post, or claiming an offer posted by an entity on its fan page. When a fan interacts with a fan page, not only does the fan engage with the entity, but the fan's interactions may also be shared with his or her direct connections, leading to broader reach and increased engagement between the entity and users of the social network.

Opportunities to increase engagement between an entity and social network users may be identified using historical and/or real-time user data. Engagement opportunities may include historically high-traffic time periods, real-time/instantaneous periods of high traffic, the passing of an interval of time between consecutive posts, or occasions where posts have reached a threshold of organic engagement. When an engagement opportunity has been identified, an action to increase engagement may be made. For example, the fan page owner may be notified of the engagement opportunity, a post may be posted by the social network on behalf of the entity at an opportune time, or a post may be promoted by the social network at an opportune time.

In an embodiment, when an engagement opportunity threshold has been reached, a post is made. Posts may then be scheduled to be posted during the identified peak traffic periods, in order to increase initial visibility of the post, which may lead to increasing engagement. In addition, engagement opportunities could be based on historical data showing peak engagement times—e.g., times when likes, shares, and comments are close to a historical maximum or threshold.

In another embodiment, real-time data may be used to identify engagement opportunities where the number of active sessions or the percentage of fans increases above a threshold. For example, an engagement opportunity may be when greater than 50% of fans of a fan page are active on the social network. Or, an engagement opportunity may be when greater than 2,000 fans of a page are active on the fan page.

In yet another embodiment, a threshold time interval may be identified, above which engagement with fans decreases.

As such, an engagement opportunity may occur whenever the "engagement interval" has passed. For example, an engagement interval may be set at three days, indicating that posting at a minimum of every three days provides a minimum level of desired fan engagement. In such a case, when three days have passed since the previous post, the social network may post to the fan page based on prior agreement with the fan page owner, or the fan page owner may be sent a notification that the engagement interval has passed.

In another embodiment, an engagement opportunity exists when a post that has been made to a fan page is measured to have reached a threshold of organic engagement, indicating sufficient fan interest that the post is worth promoting to increase engagement. Organic engagement is the degree of user interest, indicated, for example, through user likes, comments, shares, or claimed offers, that occurs without trying to increase visibility of the post to direct and indirect connections.

FIG. 1 illustrates the engagement of an entity 106 and a user 108 via a social network 100, according to an embodiment of the invention. In an embodiment, the social network 100 allows users 108 (e.g., private individuals) and entities 106 (e.g., corporations, organizations, public individuals, or concepts) to each have a presence on the network via a page (or "timeline") 104/102 presenting information about the user or entity, and providing a platform to which the user or entity can "post" information and media in order to engage with other users and entities. An example of a timeline is found in U.S. Pat. No. 7,725,492 which is incorporated herein by reference. By connecting via the social network, connected entities and users can view and share information.

Figure 2:
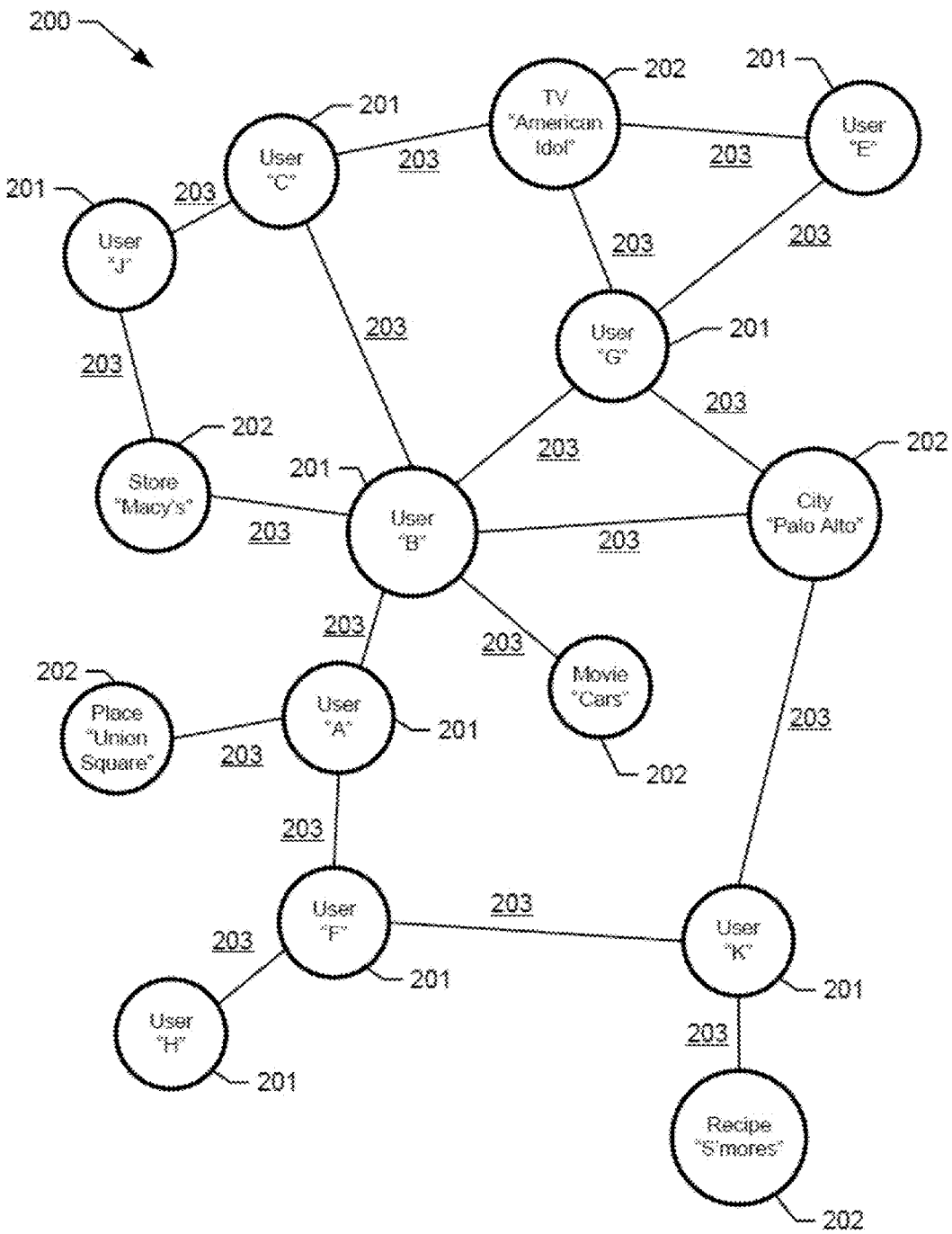
FIG. 2 is a diagram of an example social graph according to an embodiment of the invention.

FIG. 2 illustrates an example social graph 200 that may be used by a social networking system 100. In the example of FIG. 2, social graph 200 includes user nodes 201, entity nodes 202, and edges 203 between nodes. An edge 203 between a pair of nodes may represent a relationship (or an action) between the pair of nodes. For example, user "G" is a friend of user "B", user "C", and user "E", respectively, as illustrated by the edges between user nodes "G" and "B", between user nodes "G" and "C", and between user nodes "G" and "E." For example, users "C", "E", and "G" watch (or "like", or are "fans" of) a TV show "American Idol", as illustrated by the edges between the "American Idol" concept node and user nodes "C", "E", and "G", respectively. Similarly, the edge between the user node "B" and the entity node "Palo Alto" may indicate that user "B" declares "Palo Alto" as his or her city of residence (or is a "fan" of Palo Alto). The edge between the user node "B" and the entity node "Macy's" may indicate that user "B" likes, or is a fan of, the store "Macy's." Of course, social graphs can be much larger than social graph 200 illustrated in FIG. 2, and the number of edges and/or nodes in a social graph may be many orders of magnitude larger than that depicted herein.

As described earlier, an edge between a pair of nodes may indicate a direct relationship between the pair of nodes. An edge may be directed and connect an ordered pair of nodes. For example, an edge connecting a user node corresponding to a user and an entity node corresponding to a city may be directed (i.e., the user lives in the city). An edge may be undirected, as a pair of nodes connected by the edge does not have a particular order. For example, an edge connecting two user nodes can be undirected as the edge indicates a friendship between two users corresponding to the two user nodes. As described earlier herein, a degree of separation between any two nodes is defined as the minimum number of edges required to traverse the social graph from one node to the other. Thus, for user "B", the nodes for users "A", "C", and "G" are all one edge away and are thus users of first-degree and may be described as "direct connections" or "friends" of user "B." However, from the standpoint of user "B", the nodes for users "E", "F", "J", and "K" are considered to have a second-degree of separation because the shortest path from user "B" to any of these nodes requires transiting through one other node. Thus, from the standpoint of user "B", users "E", "F", "J", and "K" are deemed "indirect connections" or "friends of friends." Accordingly, user "B" is either a "friend" or a "friend of a friend" with every other user in the graph except for user "H", as the shortest path between user "B" and user "H" transits through two user nodes.

Referring back to FIG. 1, an entity 106 may post to its fan page 102. The post may be visible to users 108 on the fan page 102. In addition, the post may be visible on other user-specific pages 104 for directly connected users (or "fans"), for example, a "news feed" compiling posts from a number of a user's direct connections. In another embodiment, a fan 108 may be notified of a post by an entity 106 on its fan page 102 by email notification or push notification. A push notification is one that is initiated by a server and not a user.

Once a fan 108 has viewed a post by an entity 106, either on a fan page 102 or on a user-specific page 104, the fan 108 may engage with the entity 106, for example, by liking the post, commenting on the post, sharing the post, or claiming an offer. Such actions of engagement by a fan 108 may be visible to other users who are connected to the fan (and, as such, indirect connections to the entity) via the indirectly connected user's user-specific pages 104. In response to the fan's engagement with the post, an indirect connection may then either engage with the entity directly (primary engagement), or with the fan (secondary engagement).

Visibility is a critical factor in the extent of the "reach" of a post. The more visibility that a post has, the greater the opportunity for engagement. Visibility is increased during times of high traffic on the social network, when a high percentage of social network users are active on the social network, or by promoting a post to increase the time a post lives in a newsfeed or the number of user pages that are reached by the post (including user pages of people that are not fans). In certain situations, an entity may desire to engage with a subset of its fans, for example, fans located in North America, or fans between the ages of 18-25. In such situations, high traffic of the target demographic may increase the visibility of the post and engagement with the demographic. As such, by monitoring historical and real-time user data, opportunities for increasing engagement between an entity and users of a social network may be identified. An example of tracking organic content is found in U.S. patent application Ser. No. 13/752,148 entitled "Conversion Tracking of Organic Content in a Social Networking System." An example of calculating users performing actions on a social network system is found in U.S. patent application Ser. No. 13/627,495 entitled "Calculating Unique Social Networking System Users Performing An Action On A Social Networking System Object."

Figure 3:
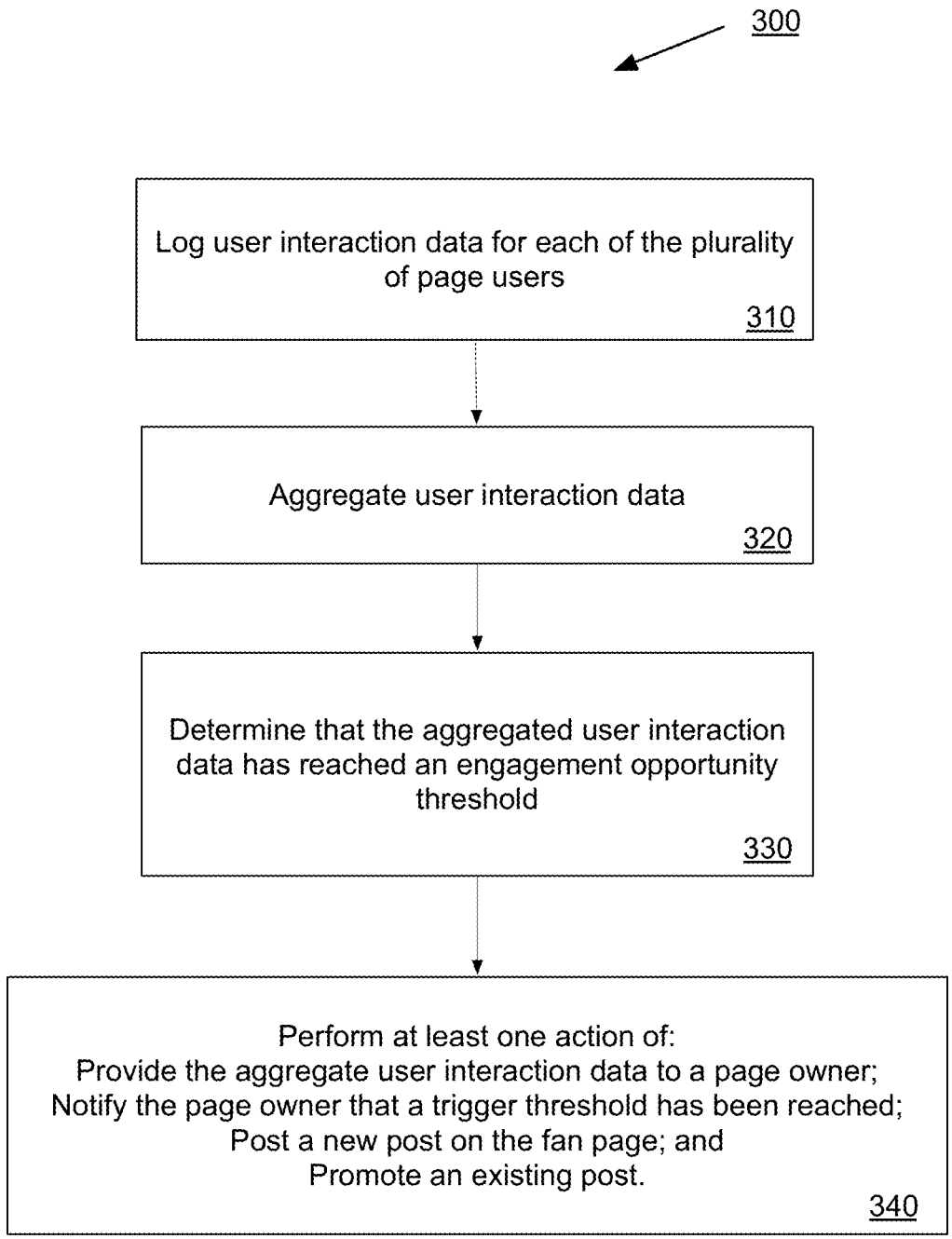
FIG. 3 is a flow chart illustrating a method for identifying opportunities to increase engagement of network users with entity pages within the network, according to an embodiment of the invention.

FIG. 3 illustrates a method 300 for identifying opportunities to increase engagement of network users with entity pages (or "fan pages") within the network, according to an embodiment of the invention. Each of these actions may be performed by the social network with or without intervention by the social network staff. At 310, user interaction data is logged for a plurality of social network users. For example, user interaction data may include whether a user currently has an active session on the social network or whether the user has an active session on the fan page. User interaction data may also include demographic or personal details of the user, such as location, age, sex, or other interests. In an embodiment, user interaction data includes past user behavior, such as claiming of an offer, liking a post, or commenting on a post. User interaction data may be logged by monitoring a user's GPS data, ticker data, and/or mobile activity data. When user interaction data is collected it is used in accordance with local laws and the user's privacy settings.

At 320, the user interaction data is aggregated. User interaction data from a plurality of users may be assembled into a data set. A data set may include all fans of an entity page, or the data set may include a subset of fans, based on a target user characteristic. Aggregation of the data may help identify engagement-related trends in the actions, behaviors, and characteristics of an entity's fans as a group.

In an embodiment, the user interaction data is rendered anonymous. User interaction data may be rendered anonymous in order to protect the privacy of individual users. In an embodiment, user interaction data is rendered anonymous by removing any user-specific or unique information from the logged and aggregated user interaction data. For example, each user's name or user ID may be removed from the data set. In another embodiment, anonymity is preserved by prohibiting data-based actions when the size of the fan group or fan subset is small enough to allow identification of individual users within the aggregated user interaction data. In an embodiment, when the number of fans in a group is below a threshold, then the corresponding user interaction data is made unavailable for identifying engagement opportunities. In another embodiment, when the dataset includes data from a percentage of fans within a group that is below a threshold, then the corresponding user interaction data is made unavailable for identifying engagement opportunities.

Figure 4:
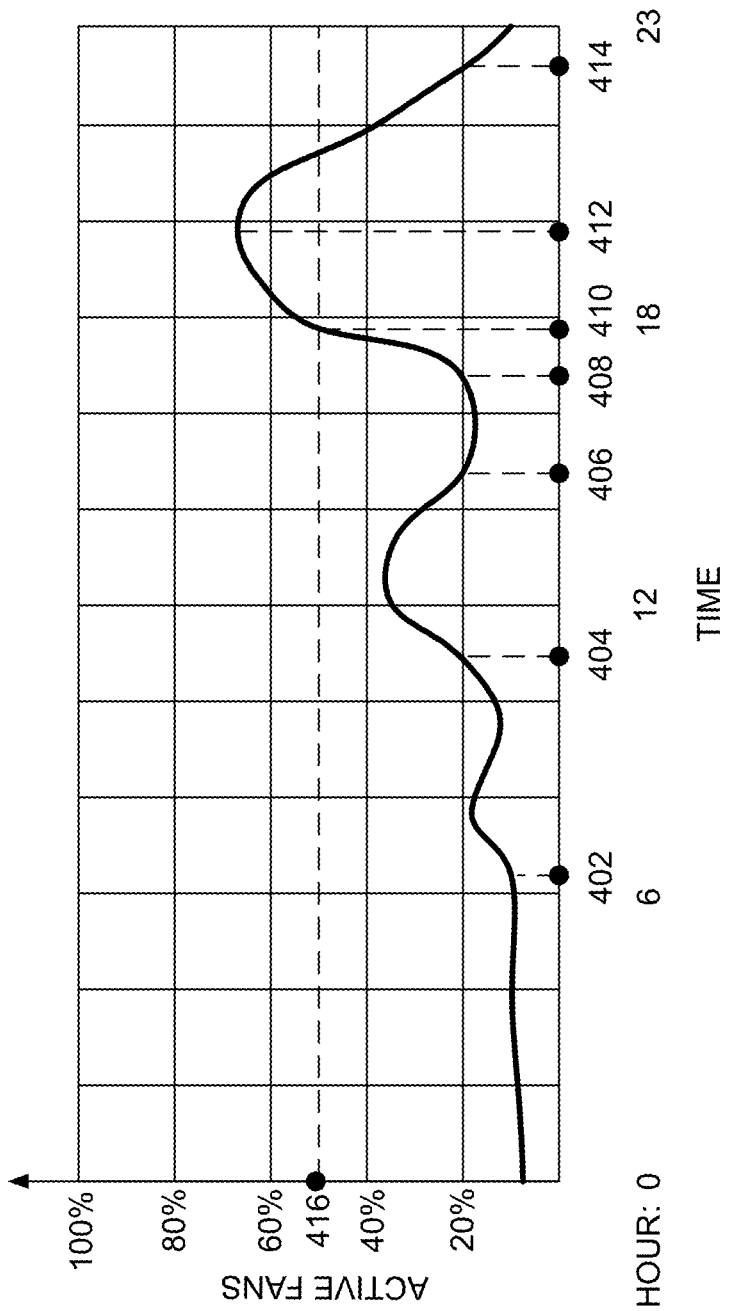
FIG. 4 illustrates engagement opportunity thresholds in relation to the percentage of active users over the course of a day, according to an embodiment of the invention.

FIG. 4 illustrates an exemplary plot of the amount of active fans (either on the social network or on the fan page) shown over the course of the 24 hours in a day. The plot illustrates the amount of active fans as a percentage of total fans, however, the amount of fans and associated thresholds may also be measured in an absolute number. The percentage of active fans shown in FIG. 4 is the percentage of fans active on the social network. However, it could just as easily be, the percentage of active fans shown in FIG. 4 is the percentage of fans active on the fan page. The active fans plotted in FIG. 4 may be a subset of all fans of a fan page, as defined by a user characteristic, for example, age. Furthermore, FIG. 4 may represent historical data, for example the average number of active fans as a function of the time of day over a multi-day time period, or FIG. 4 may represent real-time data measured for a single day. Additionally, while percentage is used here, this plot could also be done in terms of concrete numbers.

In an embodiment, the anonymity threshold requires at least 20% of fans to be active. At time 402, less than 20% of fans are active, and as a result, no user interaction data is available. Between times 404 and 406, greater than 20% of fans are active, and so, in an embodiment, user interaction data is made available to the owner of the fan page. Between times 406 and 408, the percentage of active fans drops below 20%, so that user interaction data is not available. User interaction data may be available between times 408 and 414, as a percentage of fans greater than the anonymity threshold are active.

Referring back to FIG. 3, at 330, the aggregated user interaction data is determined to have reached an engagement opportunity threshold. Engagement opportunity thresholds include periods of high traffic of target fan group, posts that have shown a threshold amount of organic engagement, and time periods above a threshold maximum interval time between posts. An engagement opportunity threshold may be established in a variety of ways to capture a variety of different engagement opportunities. Activity may be on the social network, on a website associated with a brand, or using an application associated with the entity. For example, a user may be active on Brand X's page on the social network or on Brand X's own webpage. When on Brand X's webpage or using an application, the social network may be made aware of the activity if the user is logged into the social network while on Brand X's webpage or via cookies stored on the user's device. This is subject to the user's privacy settings.

For example, the engagement opportunity threshold may be identified as when greater than a threshold percentage of fans are active. Referring to FIG. 4, in an embodiment, the engagement opportunity threshold 416 is 50% active fans. In this example, the percentage of active users crosses the engagement threshold 416 at time 410. In another embodiment, the engagement opportunity threshold may be identified as the time of peak user activity. The peak activity percentage in FIG. 4 occurs at time 412. By timing a post to coincide with historical or real-time instances of peak traffic and fan activity, the post is more likely to be viewed by fans, potentially leading to increased fan engagement.

The user interaction data may enable identification of engagement opportunities based on more specific data than active fan sessions. For example, if an entity or fan page owner desires increased engagement with a posted offer, user interaction data may be used to identify the time at which fans are most likely to claim an offer. Or, the user interaction data may be used to identify an engagement opportunity threshold for the number of active sessions of fans who have claimed an offer in the past, thereby excluding fans who have never claimed an offer. Other examples of engagement opportunity thresholds are discussed below with respect to FIGS. 5A-5B, 6, and 7.

At 340, at least one action of providing the aggregate user interaction data to a page owner (this should increase the page owner interaction with its portal and/or may encouraged the page owner to create or ask for the creation of content to engage users as detailed), notifying the page owner that a trigger threshold has been reached (this should increase the page owner interaction with its portal and/or may encouraged the page owner to create or ask for the creation of content to engage users as detailed), posting a new post on the fan page, and promoting an existing post is performed. Referring to FIG. 4, user interaction data may be provided to the fan page owner between times 404 and 406, and between times 408 and 414, such as when the engagement opportunity threshold is identified as 20% active fans. Alternatively, the fan page owner may receive notification of an engagement opportunity at time 410, such as when the engagement opportunity threshold is identified as 50% active fans based on real-time data. Notification to the fan page owner may be given by, for example, but not limited to, push notification or email message. In another embodiment, the social network may automatically post on behalf of the fan page owner when the engagement opportunity threshold is identified as the historical peak activity time (such as 412 in the example of FIG. 4). Such posts by the social network on behalf of the fan page owner may be based on a pre-arranged listing or menu of posts.

Figure 5:
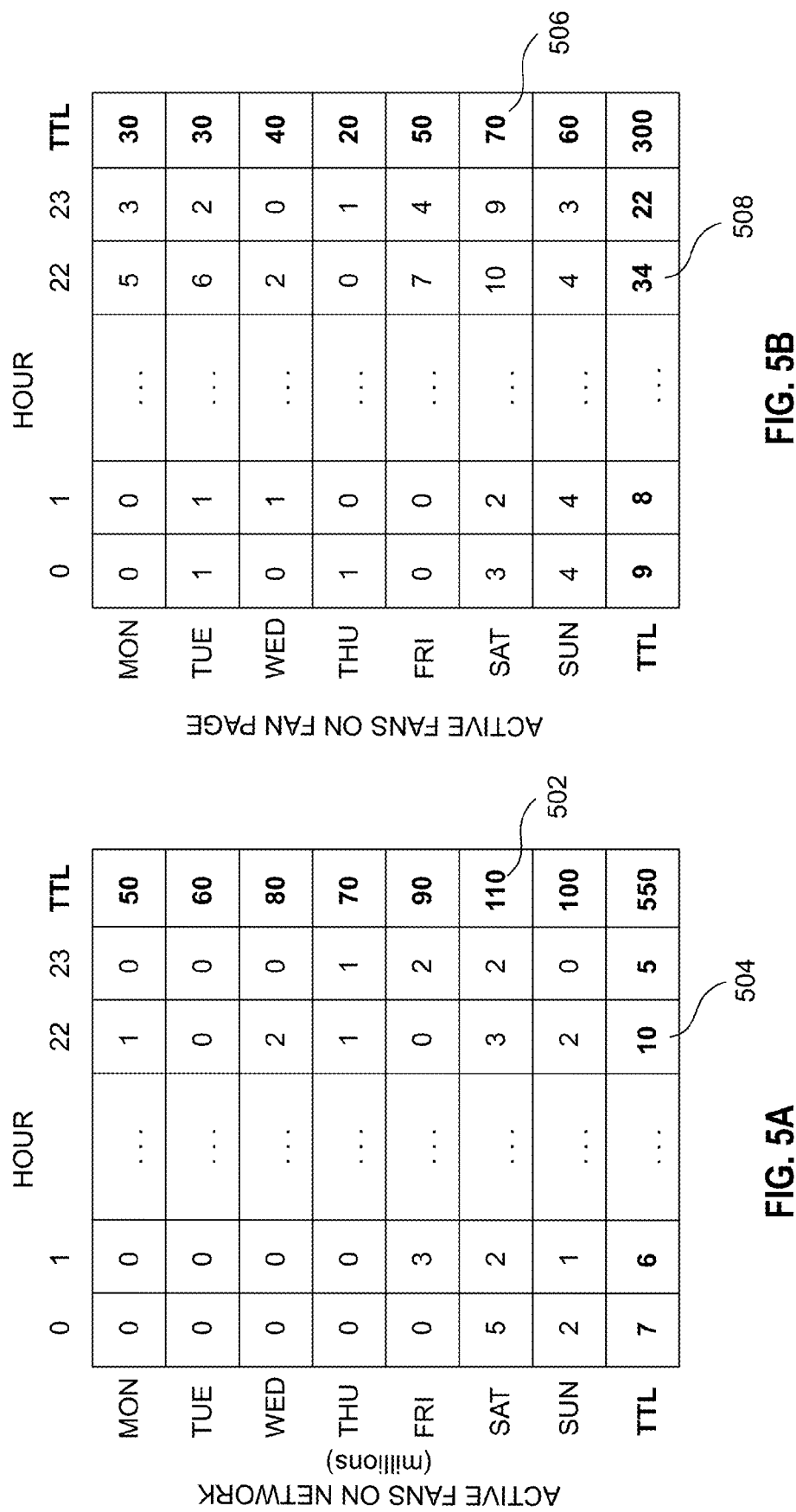
FIGS. 5A and 5B illustrate engagement opportunity thresholds relative to the number of users active on a social network and on a specific fan page over the course of a week, according to an embodiment of the invention.

An engagement opportunity threshold may be established based on a variety of time scales. For example, FIGS. 5A-5B illustrate exemplary charts showing the number of active users for each hour over a week-long period. FIG. 5A illustrates the number of fans who are active on the entire social network. FIG. 5B illustrates the number of fans who are active on the fan page. In an embodiment, the numbers of active fans are based on historical data, for example, an average over a period of multiple weeks. In another embodiment, the numbers of active fans are based on real-time data, for example, the number of active fans over a single week. In an embodiment, the engagement opportunity threshold may be identified as the day of the week having the highest number of active users, for example days 502/506. In another embodiment, a numerical engagement opportunity threshold may be identified. For example, days of the week having 100 or more active fans on the social network, or days of the week having 60 or more active fans on the fan page.

Figure 6:
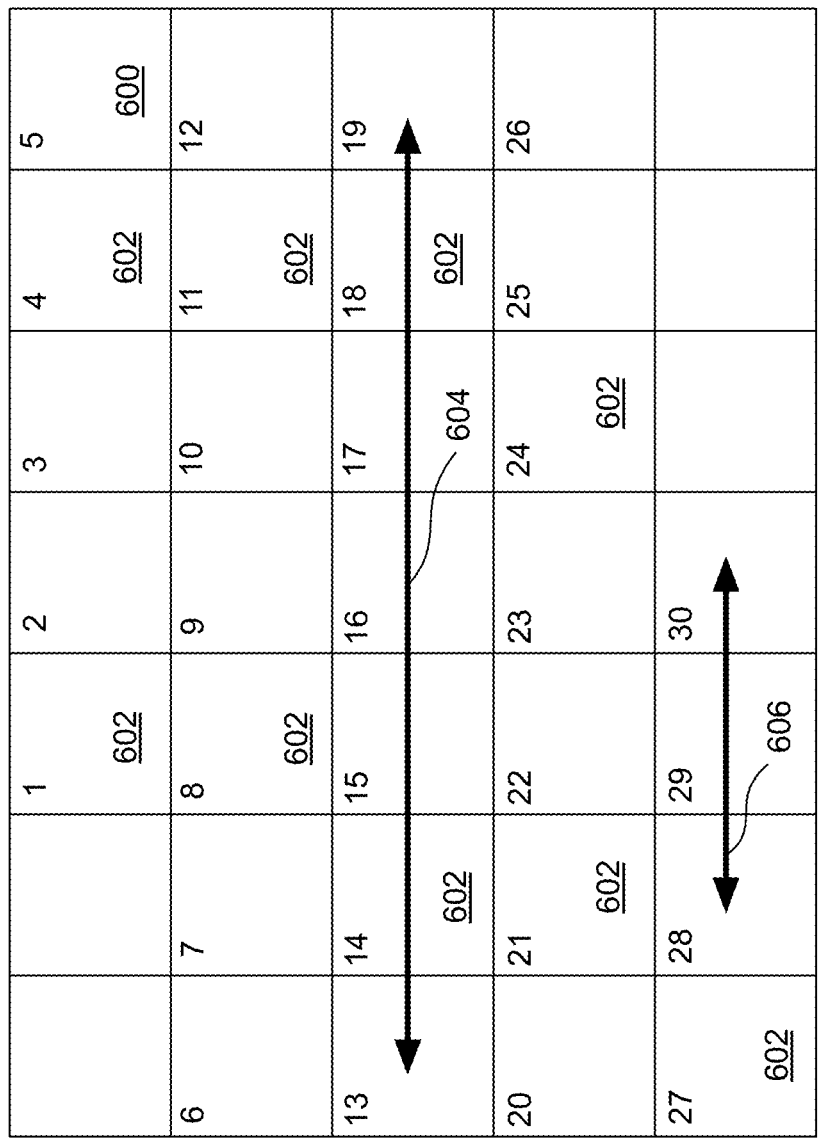
FIG. 6 illustrates a month-long engagement plan incorporating engagement opportunity thresholds, according to an embodiment of the invention.

FIG. 6 illustrates an exemplary month-long engagement plan incorporating engagement opportunity thresholds. Engagement opportunity thresholds may be based on historical data, real-time data, or both. For example, an engagement opportunity threshold may be identified as the day of the month that has historically had the highest number of active fan sessions, for example, day 600. Alternatively, an engagement opportunity threshold may be identified, for example, as any time during week 604 where greater than 20% of fans have active sessions. In another embodiment, an engagement opportunity threshold may be identified as time periods where greater than 50% of fans are active during the days 606 that have historically resulted in the most claimed offers.

In an embodiment, an engagement opportunity threshold may also be identified as a maximum interval time between posts. For example, the maximum time interval between posts may be set as three days. Posts 602 are made once the 3-day engagement opportunity threshold has been reached, according to an embodiment. Maximum time interval-based engagement opportunity thresholds may help an entity to stay present on its fans' newsfeeds. It is to be understood that identifying engagement opportunity thresholds within larger or smaller time scales is within the scope of this disclosure.

Figure 7:
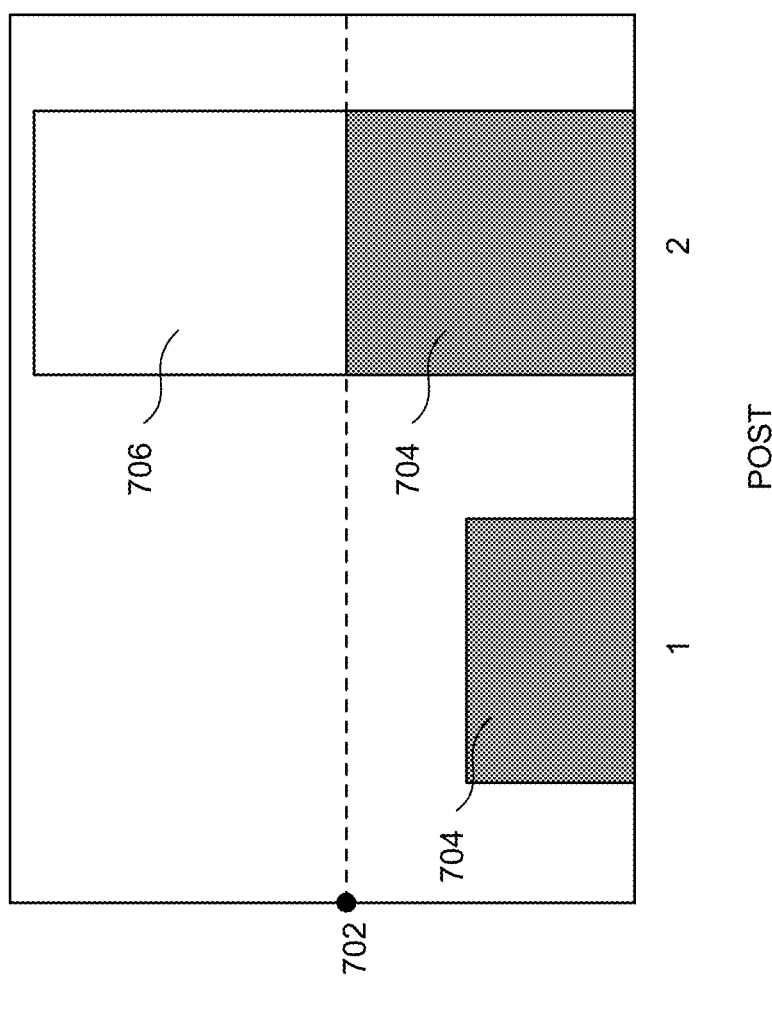
FIG. 7 illustrates an engagement opportunity threshold based on the number of times a post is shared, according to an embodiment of the invention.

FIG. 7 illustrates an exemplary engagement opportunity threshold based on the number of times a post is shared. In an embodiment, a post is made to a fan page. The post is then monitored for "organic" engagement. Organic engagement may include likes, shares, comments, or claimed offers occurring without active promotion by the social network. If a given post reaches an engagement opportunity threshold of organic engagement, the post may be automatically promoted. Promotion includes increasing the number of newsfeeds in which the post is shown, and/or the duration during which the post is displayed in fan newsfeeds. Promotion may allow increased reach and engagement with a given post. Post #1 received a number of organic shares 704 below the engagement opportunity threshold 702, according to an embodiment. Post #2 received a number of organic shares 704 equal to the engagement opportunity threshold 702, and was automatically promoted. Promotion assisted in producing additional post-promotion shares 706 for Post #2. Engagement opportunity threshold-based promotion may increase total engagement by first allowing an amount of organic engagement before promoting the post to reach additional fans and users. In addition, engagement opportunity threshold-based promotion scheme enables fan page owners to separate posts in which fans are interested and engaged—and therefore worth promoting—from those in which there is little fan interest prior to investing in promotion efforts.

Figure 8:
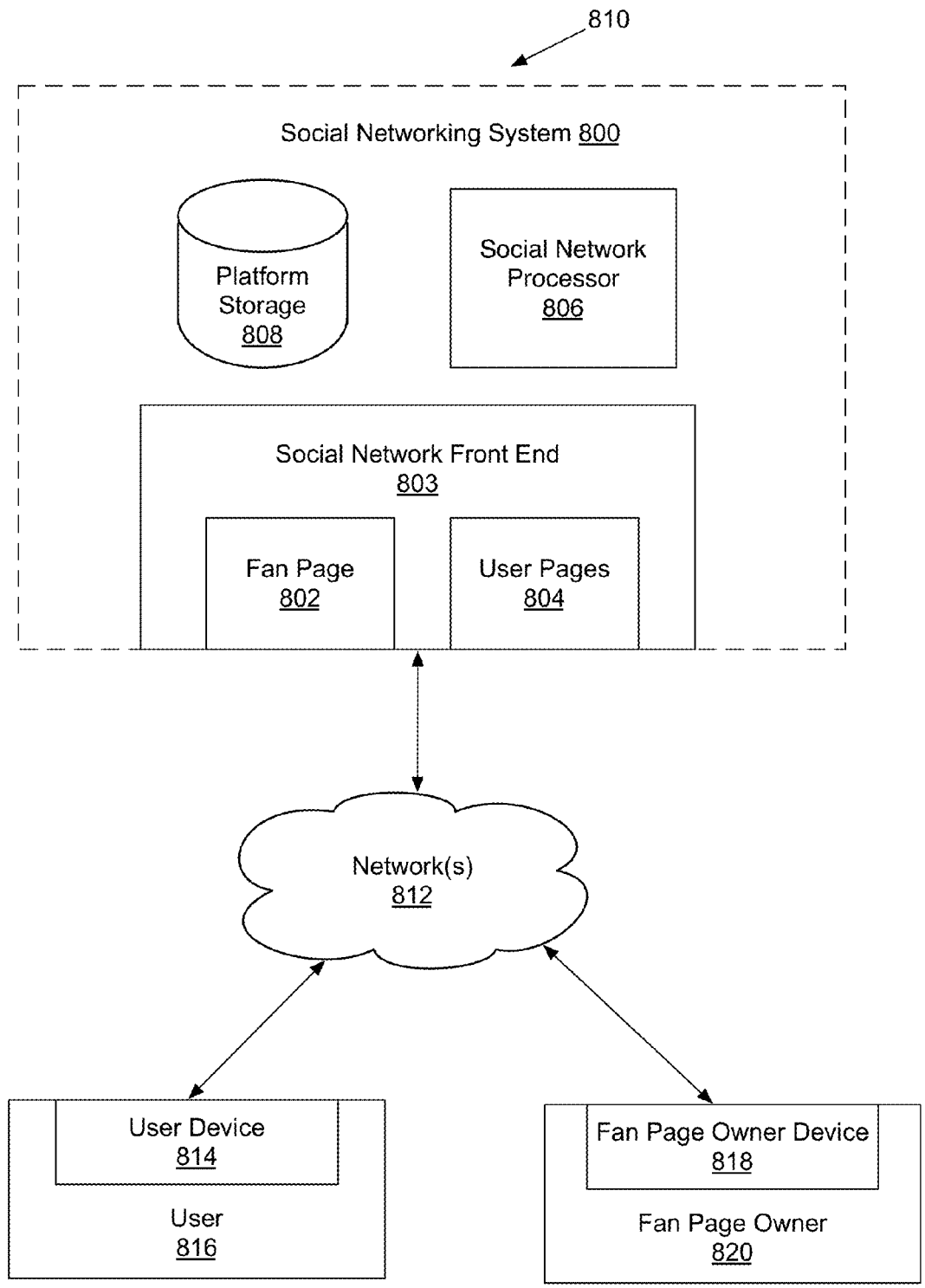
FIG. 8 illustrates, in block diagram form, a social network, according to an embodiment of the invention.

FIG. 8 illustrates, in block diagram form, an exemplary network 810 that utilizes the above described method. In this example, the network 810 is a social network, however, other networks may utilize this approach such as financial networks (banking, etc.), corporate, educational, recreational (such as online video, audio, or video game services), online shopping websites, etc. The exemplary social network 810 includes user devices 814, fan page owner devices 818, and a social networking system 800.

A user 816 or a fan page owner 820 interacts with the social networking system 800 using a device such as a personal computer or a mobile phone. For example, a fan page owner device 818 communicates with the social networking system 800 via an application such as a web browser or native application. The fan page owner 820 may use a fan page owner device 818 to build a fan page 802 within the social network front end 803. In an embodiment, the fan page owner 820 makes posts to the fan page 802. The user 716 may use a user device 814 to access and engage with the fan page 802. In an embodiment, the user 816 may also access and engage with fan page posts on his or her user page 804.

The social networking system 800 is illustrated to include a social network front end 804, platform storage 808, and processor(s) 806. In an embodiment, platform storage 808 stores user interaction data. This storage 808 may be one or more databases or may be temporary storage such as RAM. Platform storage 808 may also be external to the system.

The computer-implemented method 300 described above is performed by the processor(s) 806 utilizing corresponding user interaction data, such as active user (fan) sessions or demographic information, stored in platform storage 808.

It will be apparent from this description that aspects of the inventions may be embodied, at least in part, in software. That is, the computer-implemented method 300 may be carried out in a computer system or other data processing system 800 in response to its processor or processing system 806 executing sequences of instructions contained in a memory, such as a memory or other non-transitory machine-readable storage medium. The software may further be transmitted or received over a network. In various embodiments, hardwired circuitry may be used in combination with the software instructions to implement the present embodiments. Thus, the techniques are not limited to any specific combination of hardware circuitry and software, or to any particular source for the instructions executed by the data processing system 800.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

In various embodiments, description is made with reference to figures. However, certain embodiments may be practiced without one or more of these specific details, or in combination with other known methods and configurations. In the following description, numerous specific details are set forth, such as specific configurations, dimensions and processes, etc., in order to provide a thorough understanding of the present invention. Reference throughout this specification to "one embodiment," "an embodiment" or the like means that a particular feature, implementation, configuration, or characteristic described in connection with the embodiment is included in at least one embodiment of the invention. Thus, the appearances of the phrase "in one embodiment," "an embodiment" or the like in various places throughout this specification are not necessarily referring to the same embodiment of the invention. Furthermore, the particular features, implementations, configurations, or characteristics may be combined in any suitable manner in one or more embodiment.

What is claimed is:

1. A computer-implemented method, comprising:
accessing user interaction data for each of a plurality of users of a communication system;
determining a period of time when the user interaction data of the plurality of users of the communication system has reached an engagement opportunity threshold, wherein the user interaction data being above the engagement opportunity threshold indicates the period of time when at least an absolute number of users associated with a communication system entity are currently active on the communication system;
notifying the communication system entity that the engagement opportunity threshold has been reached; and
in response to the user interaction data reaching the engagement opportunity threshold, performing at least one of the following actions during the determined period of time:
posting a new post to the communication system to the plurality of communication system users on behalf of the communication system entity; or
promoting an existing post associated with the communication system entity.

2. The computer implemented method of claim 1, wherein the user-interaction data is logged in real-time.

3. The computer implemented method of claim 1, wherein posting the new post comprises posting a predetermined post.

4. The computer implemented method of claim 2, wherein logging user interaction data comprises one of monitoring GPS data, monitoring ticker data, and monitoring mobile activity data.

5. The computer implemented method of claim 1, wherein notifying the communication system entity that the trigger threshold has been reached includes providing a push notification to the communication system entity.

6. The computer implemented method of claim 1, further comprising:
anonymizing the user interaction data.

7. The computer implemented method of claim 6, wherein anonymizing the user interaction data comprises requiring a minimum threshold of users associated with a communication system entity to be active.

8. The computer implemented method of claim 6, wherein anonymizing the user interaction data comprises removing user-specific information.

9. The computer implemented method of claim 1, wherein the threshold is based on historical user interaction data.

10. A non-transitory computer-readable medium storing instructions, which when executed by a processing device, cause the processing device to perform a method comprising:
accessing user interaction data for each of a plurality of users of a communication system;
determining a period of time when the user interaction data of the plurality of users of the communication system has reached an engagement opportunity threshold, wherein the user interaction data being above the engagement opportunity threshold indicates the period of time when at least an absolute number of users associated with a communication system entity are currently active on the communication system;
notifying the communication system entity that the engagement opportunity threshold has been reached; and
in response to the user interaction data reaching the engagement opportunity threshold, performing at least one of the following actions during the determined period of time:
posting a new post to the communication system to the plurality of communication system users on behalf of the communication system entity; or
promoting an existing post associated with communication system entity.

11. The computer-readable medium of claim 10, wherein the user-interaction data is logged in real-time.

12. The computer-readable medium of claim 11, wherein logging user interaction data comprises one of monitoring GPS data, monitoring ticker data, and monitoring mobile activity data.

13. The computer-readable medium of claim 10, further comprising anonymizing the user interaction data.

14. An apparatus, comprising:
a storage device to store instructions; and
a processing device, wherein the processing device to execute the stored instructions to cause the apparatus to:
access user interaction data for each of a plurality of users of a communication system;
determine a period of time when the aggregated user interaction data of the plurality of users of the communication system has reached an engagement opportunity threshold, wherein the user interaction data being above the engagement opportunity threshold indicates the period of time when at least an absolute number of users associated with a communication system entity are currently active on the communication system;
notifying the communication system entity that the engagement opportunity threshold has been reached; and
in response to the user interaction data reaching the engagement opportunity threshold, perform at least one of the following actions during the determined period of time:
post a new post to the communication system to the plurality of communication system users on behalf of the communication system entity; or
promote an existing post associated with communication system entity.

15. The apparatus of claim 14, wherein the user-interaction data is logged in real-time.

16. The apparatus of claim 14, further comprising anonymizing the user interaction data.

\* \* \* \* \*